Feb. 15, 1955 A. W. RICHARDS 2,702,075
SWIVEL CHAIR RELEASABLE HEIGHT ADJUSTING MEANS
Filed June 19, 1953 3 Sheets-Sheet 1
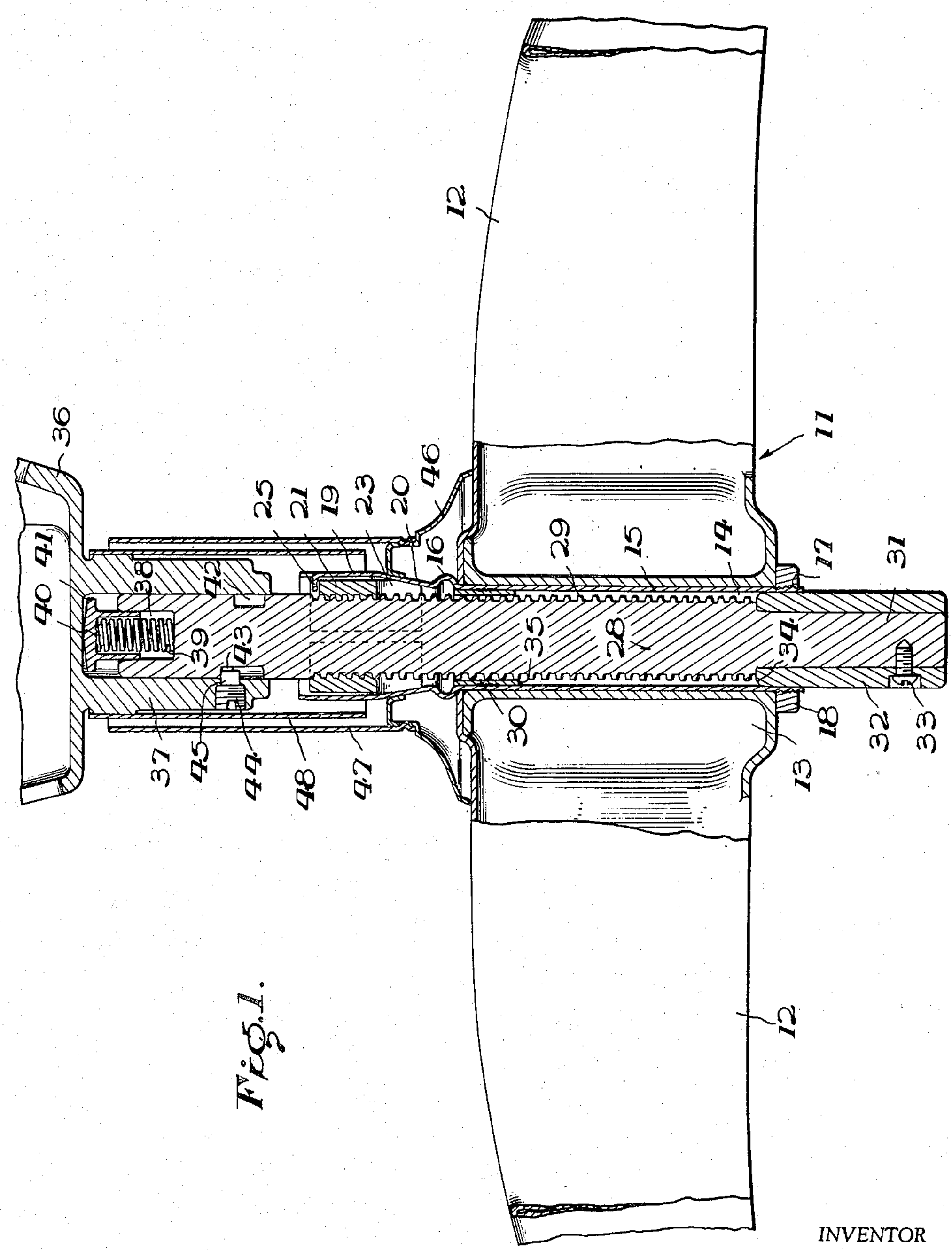
INVENTOR
Archer W. Richards.
BY [signature]
ATTORNEY Feb. 15, 1955 A. W. RICHARDS 2,702,075
SWIVEL CHAIR RELEASABLE HEIGHT ADJUSTING MEANS
Filed June 19, 1953 3 Sheets-Sheet 2
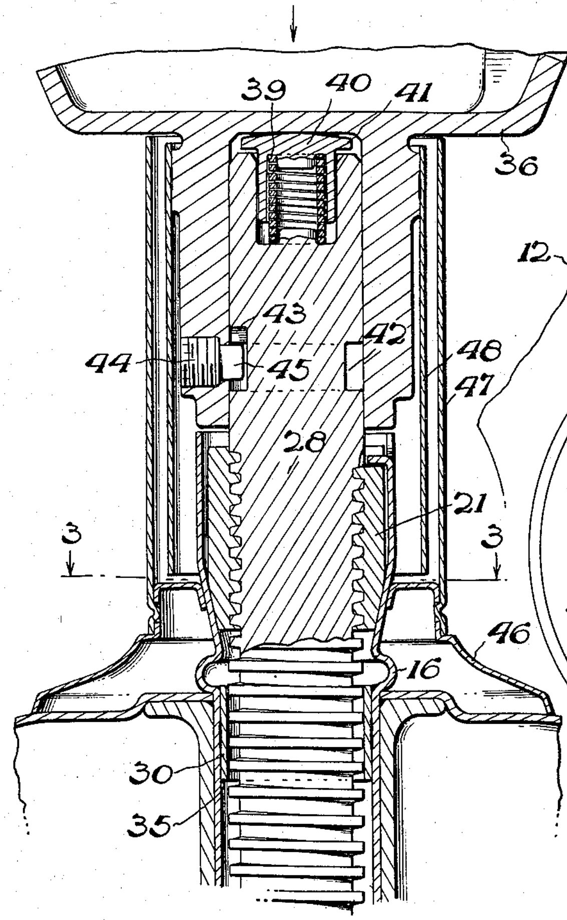
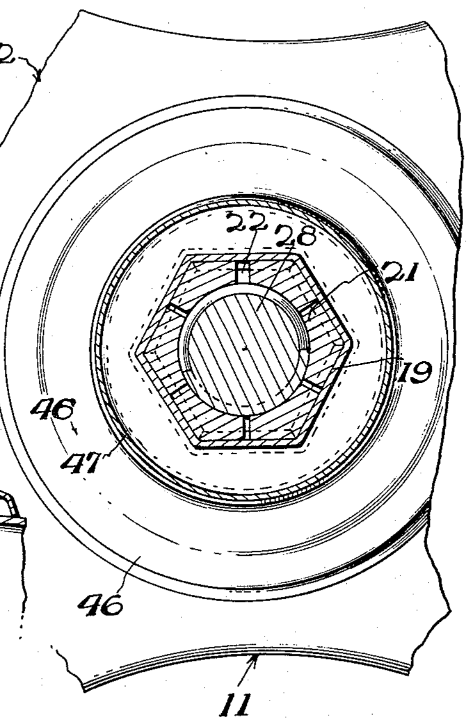
INVENTOR
Archer W. Richards
BY
ATTORNEY SWIVEL CHAIR RELEASABLE HEIGHT ADJUSTING MEANS
Filed June 19, 1953 3 Sheets-Sheet 3
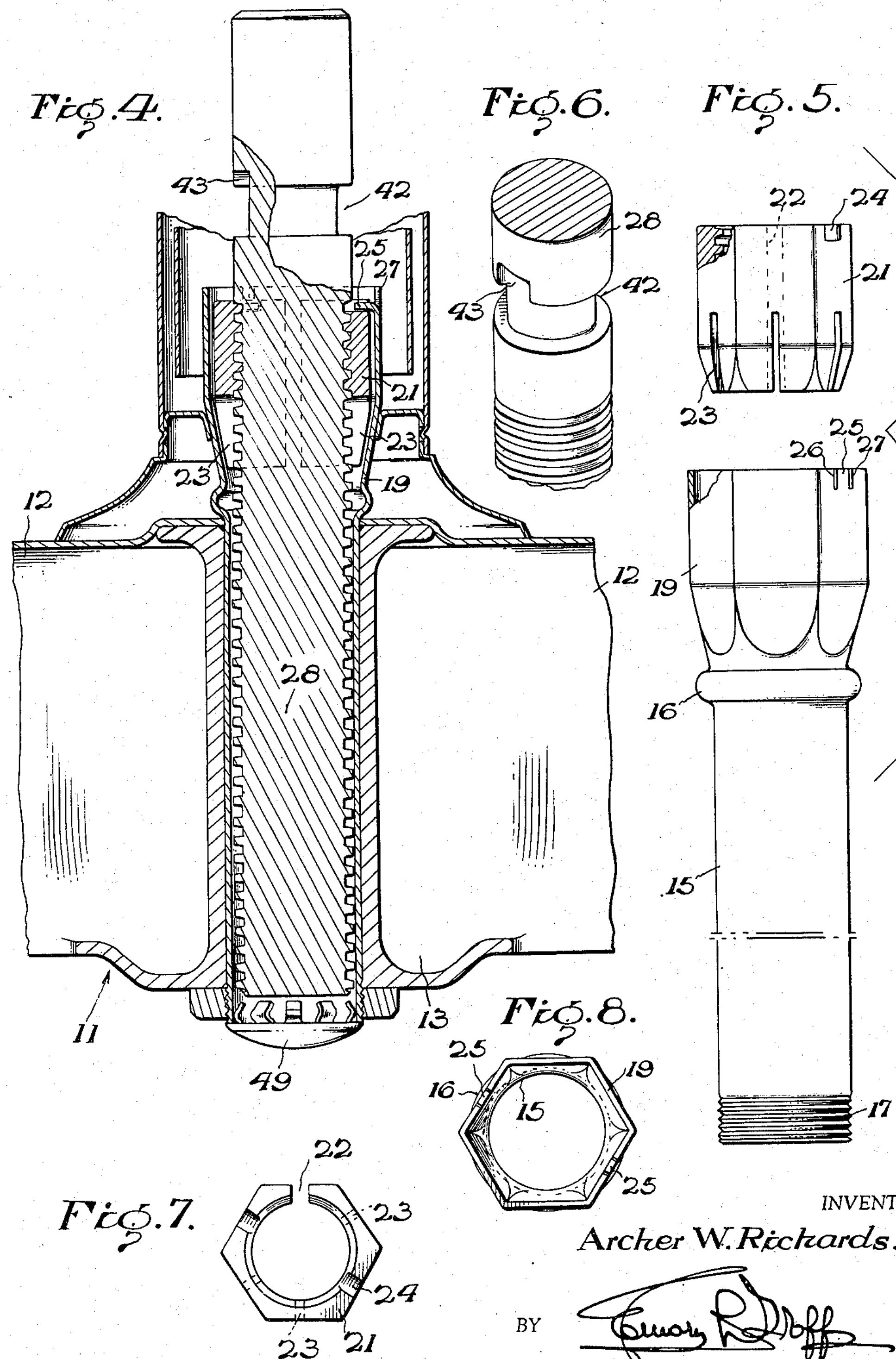
INVENTOR
Archer W. Richards.
BY
ATTORNEY United States Patent Office 2,702,075

Patented Feb. 15, 1955

2,702,075

SWIVEL CHAIR RELEASABLE HEIGHT ADJUSTING MEANS

Archer William Richards, Chagrin Falls, Ohio, assignor to The General Fireproofing Company, Youngstown, Ohio, a corporation of Ohio Application June 19, 1953, Serial No. 362,824

10 Claims. (Cl. 155—93)

This invention relates to swivel chairs of the type usually forming a part of office equipment.

Heretofore, it has been the general practice to adjust the height of the seat by elevating or lowering a screw shaft or spindle through a suitable rotatable nut arrangement located in an exposed position on the chair base beneath the seat. To effect this operation it is necessary to assume a more or less crouching position and the turning of the nut by the hand often requires more torque effort than may be conveniently applied. Moreover, this nut arrangement affords a surface for gathering dust and dirt, particularly since the small amount of lubricant applied to the nut and spindle often creeps over the hand-engaging surface due to temperature conditions and relative movement between the parts, thereby providing a potential source of soil for the hands or clothing.

Accordingly, the present invention has in view the elimination of spindle operators of the exposed type referred to by effecting height adjustment of the seat through merely turning or rotating the same when the seat is unloaded and the operator is standing in a normal upright position. When the seat is occupied or loaded the occupant may freely change his or her angular position relative to a desk or the like without altering the height.

The foregoing general object is effectuated through the provision of a threaded shaft or spindle type of chair in which a clutch mechanism automatically engages the screw for rotational movement when no occupant is in the seat and which is automatically out of engagement when an occupant is in the seat.

Further objects of the invention are the provision of improved means for supporting the threaded shaft on the base member, for connecting the seat to the threaded shaft, and for limiting the vertical movement of the shaft relative to the base member.

These and other objects and advantages of the invention will appear more fully from the following description, considered together with the accompanying drawing.

In the drawing:

Fig. 1 is a vertical section of an embodiment of this invention in its upper clutched position, the seat member and the base member being partly broken away.

Fig. 2 is an enlarged view of a portion of Fig. 1 with the clutch in its released position.

Fig. 3 is a section along the line 3—3 of Fig. 2.

Fig. 4 is a view similar to Fig. 1 of a modified embodiment of the invention.

Fig. 5 is an exploded view of the shaft shield and inner nut.

Fig. 6 is a fragmentary view of the upper part of the threaded shaft showing the clutch groove.

Fig. 7 is a plan view of the nut member.

Fig. 8 is a plan view of the shaft sleeve member.

Referring with more particularity to the drawing, in which like numerals designate like parts, the embodiment illustrated comprises a spider type base member, generally designated by the numeral 11, having a plurality of angularly spaced arms 12 (preferably four) extending laterally from a central hub 13. The outer ends of the arms 12 are provided with the usual rollers or casters (not shown) which rest on the floor.

The center of the hub 13 has a vertical bore 14 in which a hollow cylindrical sleeve member 15 is disposed. The upper section of the sleeve is provided with an outwardly extending bead or flange 16 which rests on top of the hub. The lowermost end of the sleeve projects through the lower end of the bore 14 and is provided with external threads 17 for engaging a lock nut 18 that abuts the lower end of the hub. By these means the sleeve member is removably, but firmly, secured in position. The sleeve member 15 is surmounted by a hollow hexagonal cup-like receptacle portion 19, the lower end 20 of which tapers downwardly to its point of juncture with the flange 16, substantially as shown.

Within the receptacle portion 19 there is disposed a hexagonal nut 21, one side of which is provided with a vertical slot 22, extending from the top to the bottom to provide a degree of circumferential resilience. The sides of the split nut are tapered at the bottom to form wedges 23 that are forced against the inner surface of the tapered lower end 20 of the receptacle portion 19.

The top of the nut is provided with a horizontal groove 24 for the reception of a complementary horizontal finger 25 bent inwardly from the edge portion 19 and formed by a pair of spaced vertical slots 26 and 27.

Additional grooves and fingers may be provided if desired or necessary, the function thereof being to hold the nut in position within the portion 19 and to prevent it from rotating relative to the sleeve.

A vertical shaft or spindle 28 has a central threaded portion 29 threadedly engaged with the nut 21. The shaft 28 extends downwardly through the sleeve 15 and projects beyond the lower end thereof in the embodiment illustrated in Fig. 1. The outside diameter of the shaft 28 is less than the inside diameter of the sleeve 15, in accordance with said embodiment, and a cylindrical liner 30 is disposed therein and welded to the sleeve 15 at a point just below the bead 16. The lower portion 31 of the shaft 28 is of reduced diameter and is fitted with a collar 32, the outside diameter of which is approximately equal to the inside diameter of the sleeve 15. Said collar is secured to the shaft by a recessed or countersunk screw 33. By these means the upper edge 34 of the collar is presented as an abutment shoulder for engaging the lower end 35 of the liner 30, to thereby limit the upward travel of the shaft 28 in the sleeve 15.

The upper end of the shaft 28 carries the chair seat (not shown) and the seat frame 36 includes a dependent hollow cylindrical member 37 which fits over the upper end of the shaft 28 and is rotatable and axially slidable thereon. The upper end of the shaft has an axial well 38 which houses a vertical coil spring 39. The coil spring in its unloaded position extends beyond the upper end of the shaft and is provided with a cylindrical cap 40, the sides of which fit the space between the spring and the inner walls of the well 38, after the fashion of a dash pot. This arrangement cushions the downward movement of the seat and tends to increase the feeling of security when seating is started. The top of the cap has a flanged rim 41 which abut the top of the shaft in the depressed position of the spring.

Below the well 38, a circumferential groove 42 is provided in the shaft and a lateral notch or keeper means 43, contiguous with the groove, is cut out at the top edge of the groove. A screw 44 is set in the member 37 and it has a stub pin 45 projecting radially inward therefrom to engage the notch 43 in the uppermost position of the member 37 relative to the shaft 28 and the groove 42 in the lowermost position. Consequently, in the uppermost position, the shaft and member 37 are connected or clutched for co-rotation, and in the lowermost position they are released for rotation relative to each other. (See Fig. 2.)

The coil spring 39 is of such strength that it will move and maintain the member 37 in its uppermost position against the weight of the seat structure supported thereon, but will yield under the additional weight or load of a person occupying the seat. Consequently, when a person sits in the chair, the stub pin 45 is disengaged from the notch 43 and rotational movement of the seat will not cause a rotation of the shaft 28. Therefore, the seat level will remain constant.

However, should a person wish to change the elevation of the seat, he removes himself from the chair and rotates the seat, thereby causing the stub pin 45 and notch 43 to come in clutching engagement. As a result, when the seat is unloaded, the shaft is rotated relative to the nut 21, thereby elevating or lowering it, depending upon the direction of the rotation, together with the seat carried thereby.

A hub cap 46 is placed about the top of the member 11 surrounding the sleeve and the lower section 47 of a telescoping cylindrical shaft guard is supported thereon. The upper section 48 of the guard is attached to the member 37 and moves therewith. The sections 47 and 48 overlap each other in an amount sufficient to cover the structure between the seat frame 36 and the hub cap 46 when the shaft is in its uppermost position relative to the nut 21.

The modification illustrated in Fig. 4 is similar to the embodiment described above, except that the liner 30 is omitted and the lower end of the shaft 28, together with the collar 32, is cut off immediately below the threads 29. In substitution of the function of these omitted parts, the inside diameter of the sleeve 15 and the outside diameter of the shaft 28 are made substantially the same. Also, the lowermost threads of the shaft are mutilated, thickened or otherwise modified to prevent them from passing through the nut 21 in the extreme upper position.

The lower end of the sleeve may be provided with a snap on closure cap 49 since the lower end of the shaft in this modification will not project below the end of the sleeve.

By these modifications, a completely concealed mechanism is provided.

I claim:

1. In a swivel chair, a seat, a chair base, and height adjusting means for the seat, said means including, a screw shaft, a non-rotatable nut mounted on the base and threadedly receiving said shaft, and cooperating means carried by the seat and the upper portion of the shaft for connecting the seat with the shaft when the seat is unloaded whereby rotation of the seat will turn the shaft in the nut, and when the seat is loaded release the seat to freely swivel relative to the shaft.

2. In a swivel chair, a seat, a chair base, and height adjusting means for the seat, said means including, a screw shaft having an annular groove and lateral keeper notch, a non-rotatable nut mounted on the base and threadedly receiving said shaft, a member carried by the seat and having a tubular portion telescopically fitted over the upper end of the shaft, a pin on said member cooperating with said groove and notch on the shaft, and spring means confined between said member and the upper end of the shaft to urge said pin toward the upper edge of the groove and notch.

3. In a swivel chair, a seat, a chair base, and height adjusting means for the seat, said means including a screw shaft having an annular groove with keeper means at its upper edge, a nut receiving receptacle connected with the chair base, a nut receiving said shaft and anchored against rotation in said receptacle, a member carried by the seat telescopically fitting over the upper end of the shaft, means on said member for cooperating with the said groove and keeper means, and means for urging said member normally upwardly relative to the shaft.

4. A height adjusting mechanism for a swivel chair having a base member and a seat frame, said base member having a hub with a vertical axial bore; said mechanism comprising a vertical sleeve disposed in said bore and secured to the hub; a vertical shaft slidaby mounted for rotational and axial movement in said sleeve, said shaft having a threaded portion; a nut threadedly engaged with said portion; means for holding said nut against displacement relative to said sleeve; said shaft having at its upper end an axial recess; a vertically disposed coil spring having its lower end supported by said recess; said seat frame having a cylindrical member embracing the upper end of the shaft, resting against the upper end of the spring and being slidable relative to the shaft rotationally and axially; and a clutch means for engaging and disengaging said shaft and cylindrical member when they are in different relative axial positions.

5. A mechanism as defined by claim 4 having a cap between the upper end of the coil spring and the cylindrical member, said cap having a radial flange presented for abutting engagement with the top of the shaft.

6. A mechanism as defined by claim 4 having an upper member on the interior of and secured to the sleeve at the top thereof, said member having a downwardly facing shoulder, a lower member carried by the shaft at the bottom thereof, said lower member having an upwardly facing shoulder presented for abutting engagement with said downwardly facing shoulder.

7. A mechanism as defined by claim 4 in which the clutch means comprises a radial pin projecting inwardly from the cylindrical member, an annular groove in said shaft engaging said pin in one axial position of the cylindrical member relative to the shaft, and a notch in the shaft engaging said pin in a different axial position, said notch and groove being contiguous.

8. A height adjusting mechanism for a swivel chair having a base member and a seat frame, said base member having a hub with a vertical axial bore; said mechanism comprising a vertical sleeve disposed in said bore and secured to the hub; a vertical shaft slidably mounted for rotational and axial movement in said sleeve, said shaft having a threaded portion; a nut threadedly engaged with said portion; means for holding said nut against displacement relative to said sleeve; said shaft having at its upper end an axial recess; a vertically disposed coil spring having its lower end supported by said recess; said seat frame having a cylindrical member embracing the upper end of the shaft, resting against the upper end of the spring and being slidable relative to the shaft rotationally and axially; a clutch means for engaging and disengaging said shaft and cylindrical member when they are in different relative axial positions; and means for limiting the displacement of the shaft relative to the sleeve.

9. A height adjusting mechanism for a swivel chair, having a base member and a seat frame, said base member having a hub with a vertical axial bore; said mechanism comprising a vertical sleeve disposed in said bore and secured to the hub; a vertical shaft slidably mounted for rotational and axial movement in said sleeve, said shaft having a threaded portion; said sleeve having also an upper flanged extension; a nut disposed in said extension in threaded engagement with said shaft; means for securing said nut against movement relative to said extension; said shaft having at its upper end an axial recess; a vertically disposed coil spring having its lower end supported by said recess; said seat frame having a cylindrical member embracing the upper end of the shaft, resting against the upper end of the spring and being slidable relative to the shaft rotationally and axially; and a clutch means for engaging and disengaging said shaft and cylindrical member when they are in different relative axial positions.

10. A height adjusting mechanism for a swivel chair, having a base member and a seat frame, said base member having a hub with a vertical axial bore; said mechanism comprising a vertical sleeve disposed in said bore and secured to the hub; a vertical shaft slidably mounted for rotational and axial movement in said sleeve, said shaft having a threaded portion; said sleeve having also an upper flanged extension a portion of said extension being tapered; a nut disposed in said extension in threaded engagement with said shaft; said nut having resilient wedge formations at the bottom in forced engagement with the inner walls of said tapered portion and having also a radial slot; a finger projecting inwardly from said sleeve in said slot; said shaft having at its upper end an axial recess; a vertically disposed coil spring having its lower end supported by said recess; said seat frame having a cylindrical member embracing the upper end of the shaft, resting against the upper end of the spring and being slidable relative to the shaft rotationally and axially; and a clutch means for engaging and disengaging said shaft and cylindrical member when they are in different relative axial positions.

References Cited in the file of this patent

UNITED STATES PATENTS

| | | |
|---|---|---|
| 1,777,204 | Korsten | Sept. 30, 1930 |
| 2,137,178 | Merivaara | Nov. 15, 1938 |
| 2,139,462 | Purdy | Dec. 6, 1938 |
| 2,501,976 | Vitek | Mar. 28, 1950 |
| 2,543,924 | Mondy | Mar. 6, 1951 |